(12) United States Patent
Li

(10) Patent No.: US 10,856,137 B2
(45) Date of Patent: Dec. 1, 2020

(54) TRANSFER OF A NETWORK SUBSCRIPTION PROFILE BETWEEN DEVICES

(71) Applicant: Telefonaktiebolaget LM Ericsson (publ), Stockholm (SE)

(72) Inventor: Qiang Li, Täby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/468,226

(22) PCT Filed: May 4, 2017

(86) PCT No.: PCT/EP2017/060662
§ 371 (c)(1),
(2) Date: Jun. 10, 2019

(87) PCT Pub. No.: WO2018/108329
PCT Pub. Date: Jun. 21, 2018

(65) Prior Publication Data
US 2019/0335319 A1    Oct. 31, 2019

Related U.S. Application Data

(60) Provisional application No. 62/432,862, filed on Dec. 12, 2016.

(51) Int. Cl.
*H04W 8/20* (2009.01)
(52) U.S. Cl.
CPC ................................ *H04W 8/205* (2013.01)

(58) Field of Classification Search
CPC ...... H03W 8/205; H04W 8/182; H04W 8/205
See application file for complete search history.

(56) References Cited

U.S. PATENT DOCUMENTS 9,531,831 B1 * 12/2016 Cuadrat ................ H04L 67/303
2015/0134958 A1    5/2015 Merrien et al.
(Continued)

FOREIGN PATENT DOCUMENTS

DE    10 2014 014 078 A1    3/2016
JP    2010-532107 A    9/2010

OTHER PUBLICATIONS

International Search Report and Written Opinion issued in International Application No. PCT/EP2017/060662, dated Sep. 11, 2017 (16 pages).

(Continued)

*Primary Examiner* — Myron Wyche
(74) *Attorney, Agent, or Firm* — Rothwell, Figg, Ernst & Manbeck, P.C.

(57) ABSTRACT

There is provided mechanisms for transfer of a network subscription profile from a first subscriber device to a second subscriber device. The method is performed by the first subscriber device. The method comprises establishing a secure binding with the second subscriber device. The method comprises 5 obtaining a request for transfer of the network subscription profile. The method comprises obtaining end-user confirmation of the transfer of the network subscription profile to the second subscriber device. The method comprises deleting the network subscription profile from itself upon transfer of the network subscription profile to the second subscriber device.

26 Claims, 8 Drawing Sheets

(56) References Cited

U.S. PATENT DOCUMENTS

2015/0237496 A1    8/2015   Gao et al.
2016/0088465 A1*   3/2016   Golla ................... H04W 8/205
                                                           455/450
2016/0241564 A1    8/2016   Järvinen et al.

OTHER PUBLICATIONS

"United Kingdom: Leading M2M alliances back the GSMA embedded sim specification to accelerate the Internet of things", MENA Report, London, Mar. 4, 2015 (35 pages).
GSM Association Official Document SGP.22—RSP Technical Specification, Version 1.1, Jun. 9, 2016 (125 pages).
GSM Association Official Document SGP.21—RSP Architecture, Version 2.0, Aug. 23, 2016 (94 pages).

* cited by examiner

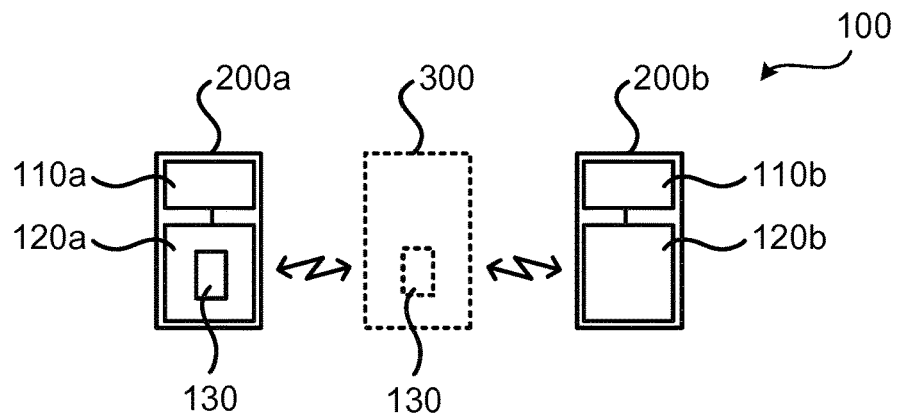
Fig. 1
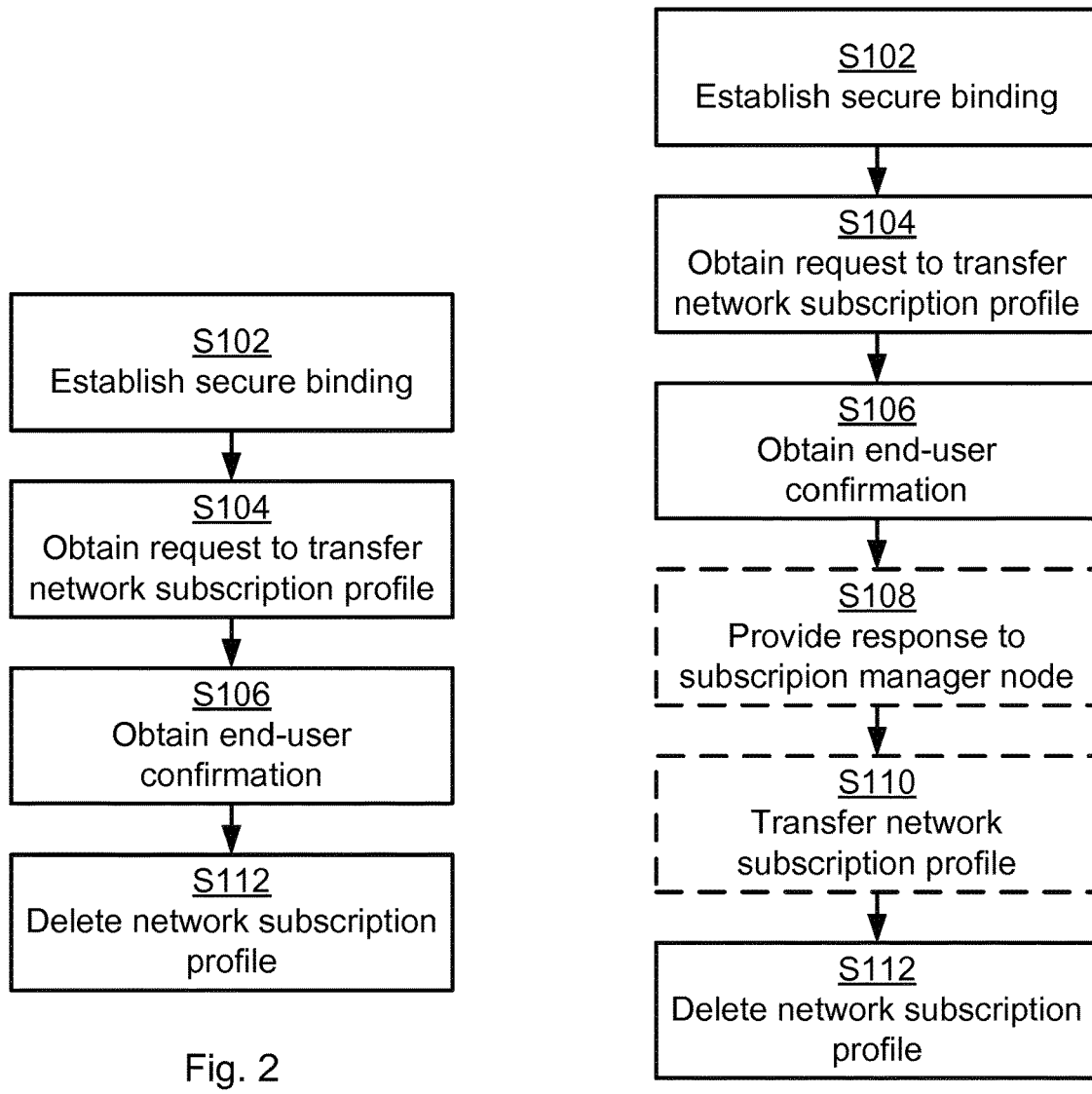
Fig. 2
Fig. 3

TRANSFER OF A NETWORK SUBSCRIPTION PROFILE BETWEEN DEVICES

CROSS REFERENCE TO RELATED APPLICATION(S)

This application is a 35 U.S.C. § 371 National Stage of International Patent Application No. PCT/EP2017/060662, filed May 4, 2017, designating the United States and claiming priority to U.S. provisional application No. 62/432,862 filed on Dec. 12, 2016. The above identified applications are incorporated by reference.

TECHNICAL FIELD

Embodiments presented herein relate to transfer of a network subscription profile, for example from a first subscriber device to a second subscriber device.

BACKGROUND

Mobile networks are being used to connect all sorts of devices; automated reading of utility meters, intelligent connectivity of cars and commercial vehicles to enable drivers to access navigation, infotainment or breakdown services, traffic lights, home security and assisted living.

A subscriber identity module, or subscriber identification module, (SIM) is an integrated circuit chip that is intended to securely store the international mobile subscriber identity (IMSI) number and its related encryption key, as well as other information relevant for the subscription, which is used to identify and authenticate subscriptions on the devices. The functionality of the SIM circuit could be part of the functionality of a Universal Integrated Circuit Card (UICC) physical smart card.

With traditional plastic SIM cards, the end-user can anytime detach the SIM from a first subscriber device and attach it into a second subscriber device. Some reasons could be that the first subscriber device does not operate properly, the battery of the first subscriber device is drained, or that end-user for some other reason needs to use the second subscriber device.

The GSM Association (GSMA), where GSM is short for Global System for Mobile communications, has released a technical specification denoted SGP.22—RSP defining remote SIM provisioning for consumer subscriber devices and a technical specification denoted SGP.02 disclosing a remote provisioning architecture for Embedded UICC (eUICC), which targets machine-to-machine (M2M) type communications subscriber devices. In short, the operator uses an entity called SM-DP+/SM-DP (short for Subscription Management—Data Preparation) for creation of SIM profiles that are later installed from the SM-DP/SM-DP+ to the eUICC. For the consumer subscriber devices, the profile is installed through a Local Profile Assistant (LPA) on the consumer subscriber device to the Issuer Security Domain Profile (ISD-P) on the eUICC in the device. For the M2M subscriber devices, the SM-DP installs the profile via a separate (external) entity, SM-SR, to the ISD-P on the subscriber device.

However, unlike traditional SIM cards, the eUICC cannot be detached from one subscriber device and attached into another subscriber device.

Hence, there is still a need for an improved handling of network subscriptions.

SUMMARY

An object of embodiments herein is to provide efficient handling of network subscriptions.

According to a first aspect there is presented a method for transfer of a network subscription profile from a first subscriber device to a second subscriber device. The method is performed by the first subscriber device. The method comprises establishing a secure binding with the second subscriber device. The method comprises obtaining a request for transfer of the network subscription profile. The method comprises obtaining end-user confirmation of the transfer of the network subscription profile to the second subscriber device. The method comprises deleting the network subscription profile from itself upon transfer of the network subscription profile to the second subscriber device.

According to a second aspect there is presented a subscriber device for transfer of a network subscription profile from the subscriber device to another subscriber device. The subscriber device comprises processing circuitry. The processing circuitry is configured to cause the subscriber device to establish a secure binding with said another subscriber device. The processing circuitry is configured to cause the subscriber device to obtain a request for transfer of the network subscription profile. The processing circuitry is configured to cause the subscriber device to obtain end-user confirmation of the transfer of the network subscription profile to said another subscriber device. The processing circuitry is configured to cause the subscriber device to delete the network subscription profile from the subscriber device upon transfer of the network subscription profile to said another subscriber device.

According to a third aspect there is presented a subscriber device for transfer of a network subscription profile from the subscriber device to another subscriber device. The subscriber device comprises processing circuitry and a storage medium. The storage medium stores instructions that, when executed by the processing circuitry, cause the subscriber device to perform operations, or steps. The operations, or steps, cause the subscriber device to establish a secure binding with said another subscriber device. The operations, or steps, cause the subscriber device to obtain a request for transfer of the network subscription profile. The operations, or steps, cause the subscriber device to obtain end-user confirmation of the transfer of the network subscription profile to said another subscriber device. The operations, or steps, cause the subscriber device to delete the network subscription profile from the subscriber device upon transfer of the network subscription profile to said another subscriber device.

According to a fourth aspect there is presented a subscriber device for transfer of a network subscription profile from the subscriber device to another subscriber device. The subscriber device comprises an establish module configured to establish a secure binding with said another subscriber device. The subscriber device comprises an obtain module configured to obtain a request for transfer of the network subscription profile. The subscriber device comprises an obtain module configured to obtain end-user confirmation of the transfer of the network subscription profile to said another subscriber device. The subscriber device comprises a delete module configured to delete the network subscription profile from the subscriber device upon transfer of the network subscription profile to said another subscriber device.

According to a fifth aspect there is presented a computer program for transfer of a network subscription profile from a first subscriber device to a second subscriber device, the computer program comprising computer program code which, when run on processing circuitry of the first subscriber device, causes the first subscriber device to perform a method according to the first aspect.

According to a sixth aspect there is presented a method for transfer of a network subscription profile from a first subscriber device to a second subscriber device. The method is performed by the second subscriber device. The method comprises establishing a secure binding with the first subscriber device. The method comprises obtaining end-user input to initiate transfer of the network subscription profile. The method comprises providing a request for transfer of the network subscription profile to the second subscriber device. The method comprises receiving the network subscription profile. The method comprises installing the network subscription profile on the second subscriber device.

According to a seventh aspect there is presented a subscriber device for transfer of a network subscription profile from another subscriber device to the subscriber device. The subscriber device comprises processing circuitry. The processing circuitry is configured to cause the subscriber device to establish a secure binding with said another subscriber device. The processing circuitry is configured to cause the subscriber device to obtain end-user input to initiate transfer of the network subscription profile. The processing circuitry is configured to cause the subscriber device to provide a request for transfer of the network subscription profile to the subscriber device. The processing circuitry is configured to cause the subscriber device to receive the network subscription profile. The processing circuitry is configured to cause the subscriber device to install the network subscription profile on the subscriber device.

According to an eighth aspect there is presented a subscriber device for transfer of a network subscription profile from another subscriber device to the subscriber device. The subscriber device comprises processing circuitry and a storage medium. The storage medium stores instructions that, when executed by the processing circuitry, cause the subscriber device to perform operations, or steps. The operations, or steps, cause the subscriber device to establish a secure binding with said another subscriber device. The operations, or steps, cause the subscriber device to obtain end-user input to initiate transfer of the network subscription profile. The operations, or steps, cause the subscriber device to provide a request for transfer of the network subscription profile to the subscriber device. The operations, or steps, cause the subscriber device to receive the network subscription profile. The operations, or steps, cause the subscriber device to install the network subscription profile on the subscriber device.

According to a ninth aspect there is presented a subscriber device for transfer of a network subscription profile from another subscriber device to the subscriber device. The subscriber device comprises an establish module configured to establish a secure binding with said another subscriber device. The subscriber device comprises an obtain module configured to obtain end-user input to initiate transfer of the network subscription profile. The subscriber device comprises a provide module configured to provide a request for transfer of the network subscription profile to the subscriber device. The subscriber device comprises a receive module configured to receive the network subscription profile. The subscriber device comprises an install module configured to install the network subscription profile on the subscriber device.

According to a tenth aspect there is presented a computer program transfer of a network subscription profile from a first subscriber device to a second subscriber device, the computer program comprising computer program code which, when run on processing circuitry of the second subscriber device, causes the second subscriber device to perform a method according to the sixth aspect.

According to an eleventh aspect there is presented a method for transfer of a network subscription profile. The method is performed by a subscription manager node. The method comprises establishing a secure binding between the a subscriber device and a second subscriber device. The method comprises obtaining end-user input to initiate transfer of the network subscription profile from the second subscriber device. The method comprises obtaining end-user confirmation of the transfer of the network subscription profile to the second subscriber device from the first subscriber device. The method comprises enabling download of the network subscription profile from the subscription manager node to the second subscriber device.

According to a twelfth aspect there is presented a subscription manager node for transfer of a network subscription profile. The subscription manager node comprises processing circuitry. The processing circuitry is configured to cause the subscription manager node to establish a secure binding between a first subscriber device and a second subscriber device. The processing circuitry is configured to cause the subscription manager node to obtain end-user input to initiate transfer of the network subscription profile from the second subscriber device. The processing circuitry is configured to cause the subscription manager node to obtain end-user confirmation of the transfer of the network subscription profile to the second subscriber device from the first subscriber device. The processing circuitry is configured to cause the subscription manager node to enable download of the network subscription profile from the subscription manager node to the second subscriber device.

According to a thirteenth aspect there is presented a subscription manager node for transfer of a network subscription profile. The subscription manager node comprises processing circuitry and a storage medium. The storage medium stores instructions that, when executed by the processing circuitry, cause the subscription manager node to perform operations, or steps. The operations, or steps, cause the subscription manager node to establish a secure binding between a first subscriber device and a second subscriber device. The operations, or steps, cause the subscription manager node to obtain end-user input to initiate transfer of the network subscription profile from the second subscriber device. The operations, or steps, cause the subscription manager node to obtain end-user confirmation of the transfer of the network subscription profile to the second subscriber device from the first subscriber device. The operations, or steps, cause the subscription manager node to enable download of the network subscription profile from the subscription manager node to the second subscriber device.

According to a fourteenth aspect there is presented a subscription manager node for transfer of a network subscription profile. The subscription manager node comprises an establish module configured to establish a secure binding between a first subscriber device and a second subscriber device. The subscription manager node comprises an obtain module configured to obtain end-user input to initiate transfer of the network subscription profile from the second subscriber device. The subscription manager node comprises an obtain module configured to obtain end-user confirmation of the transfer of the network subscription profile to the second subscriber device from the first subscriber device. The subscription manager node comprises an enable module configured to enable download of the network subscription profile from the subscription manager node to the second subscriber device.

According to a fifteenth aspect there is presented a computer program for transfer of a network subscription profile, the computer program comprising computer program code which, when run on processing circuitry of a subscription manager node, causes the subscription manager node to perform a method according to the eleventh aspect.

According to a sixteenth aspect there is presented a computer program product comprising a computer program according to at least one of the fifth aspect, the tenth aspect, and the fifteenth aspect and a computer readable storage medium on which the computer program is stored. The computer readable storage medium can be a non-transitory computer readable storage medium.

Advantageously these methods, these subscriber devices, these subscription manager nodes, and these computer programs provide efficient handling of network subscriptions.

Advantageously these methods, these subscriber devices, these subscription manager nodes, and these computer programs enable network subscription profiles to be shared and transferred across subscriber devices, thus saving subscription costs as well as costs for manufacturing SIM cards.

Advantageously these methods, these subscriber devices, these subscription manager nodes, and these computer programs enable a second subscriber device without a bootstrap profile to temporarily borrow the network subscription profile from the first subscriber device in order to bootstrap.

Advantageously these methods, these subscriber devices, these subscription manager nodes, and these computer programs enable SIM cloning to be avoided.

It is to be noted that any feature of the first, second, third, fourth, fifth, sixth seventh, eight, ninth, tenth, eleventh, twelfth, thirteen, fourteenth, fifteenth and sixteenth aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communications system according to embodiments;

FIGS. 2, 3, 4, 5, 6, and 7 are flowcharts of methods according to embodiments;

DETAILED DESCRIPTION

Figure 4:
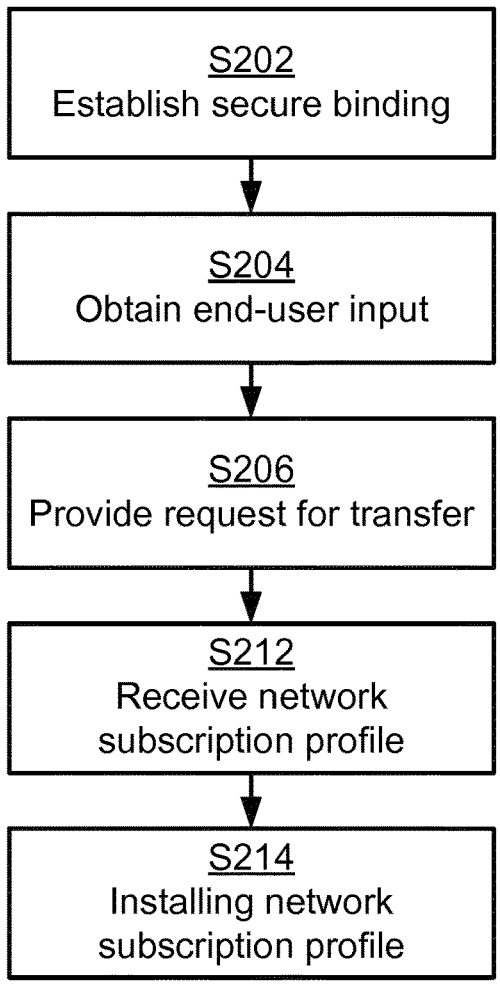

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

FIG. 1 is a schematic diagram illustrating a communications system 100 where embodiments presented herein can be applied. The communications system 100 comprises subscriber devices 200a, 200b. Examples of subscriber devices 200a, 200b include, but are not limited to portable wireless devices, mobile stations, mobile phones, handsets, wireless local loop phones, user equipment (UE), smartphones, laptop computers, tablet computers, sensors, meters, Internet-of-Things devices, etc.

Each subscriber device 200a, 200b comprise a Profile Management Application (PMA) 110a, 110b and an eUICC 120a, 120b. Aspects of the eUICC 120a, 120b have been disclosed above. The PMA 110a, 110b is assumed to be an authorized application on the subscriber device 200a, 200b (e.g. implemented as part of device operating system) which is configured to perform profile management operations towards the eUICC 120a, 120b. The PMA 120a, 120b also has end-user interface.

The communications system 100 further comprises an eUICC Subscription Manager (eSM), hereinafter referred to as an subscription manager node 300. The subscription manager node 300 is configured handle network subscription profiles 130 for the eUICC 120a, 120b.

In the illustrative example of FIG. 1 a network subscription profile 130 is provided in subscriber device 200a. The embodiments disclosed herein relate to mechanisms for transfer of the network subscription profile 130 to the other subscriber device 200b.

The subscriber devices 200a, 200b may be configured for direct communication with each other and thereby be able to by themselves transfer the network subscription profile 130 from one of the subscriber devices 200a, 200b to the other of the subscriber devices 200a, 200b. Alternatively the transfer of the network subscription profile 130 is facilitated by the subscription manager node 300.

The embodiments disclosed herein thus relate to mechanisms for transfer of a network subscription profile 130. In order to obtain such mechanisms there is provided a subscriber device acting as a first subscriber device 200a, a method performed by the first subscriber device 200a, a computer program product comprising code, for example in the form of a computer program, that when run on processing circuitry of the first subscriber device 200a, causes the first subscriber device 200a to perform the method. In order to obtain such mechanisms there is further provided a subscriber device acting as a second subscriber device 200b, a method performed by the second subscriber device 200b, and a computer program product comprising code, for example in the form of a computer program, that when run on processing circuitry of the second subscriber device 200b, causes the second subscriber device 200b to perform the method. In order to obtain such mechanisms there is further provided a subscription manager node 300, a method performed by the subscription manager node 300, and a computer program product comprising code, for example in the form of a computer program, that when run on processing circuitry of the subscription manager node 300, causes the subscription manager node 300 to perform the method.

Figure 5:
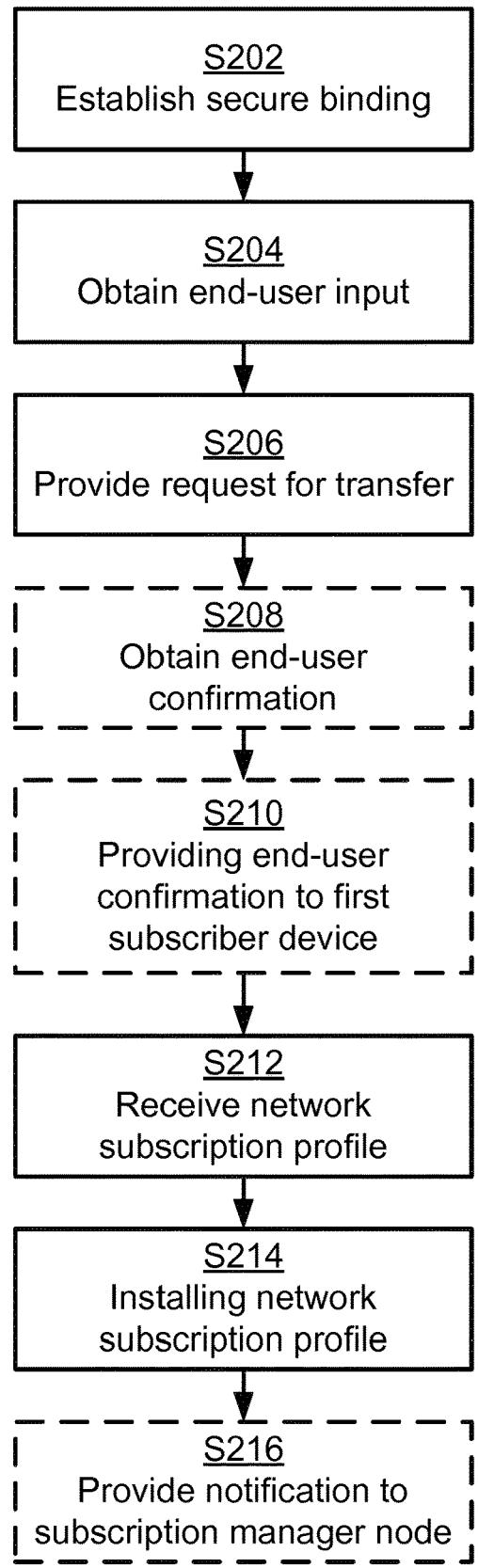
Figure 6:
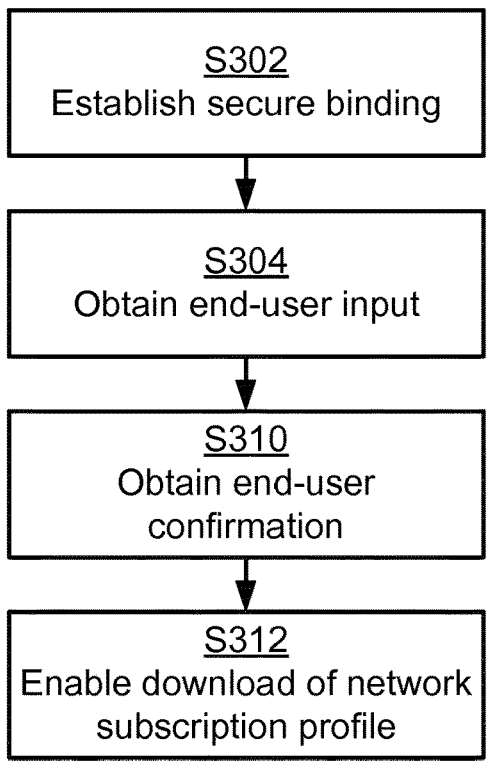
Figure 7:
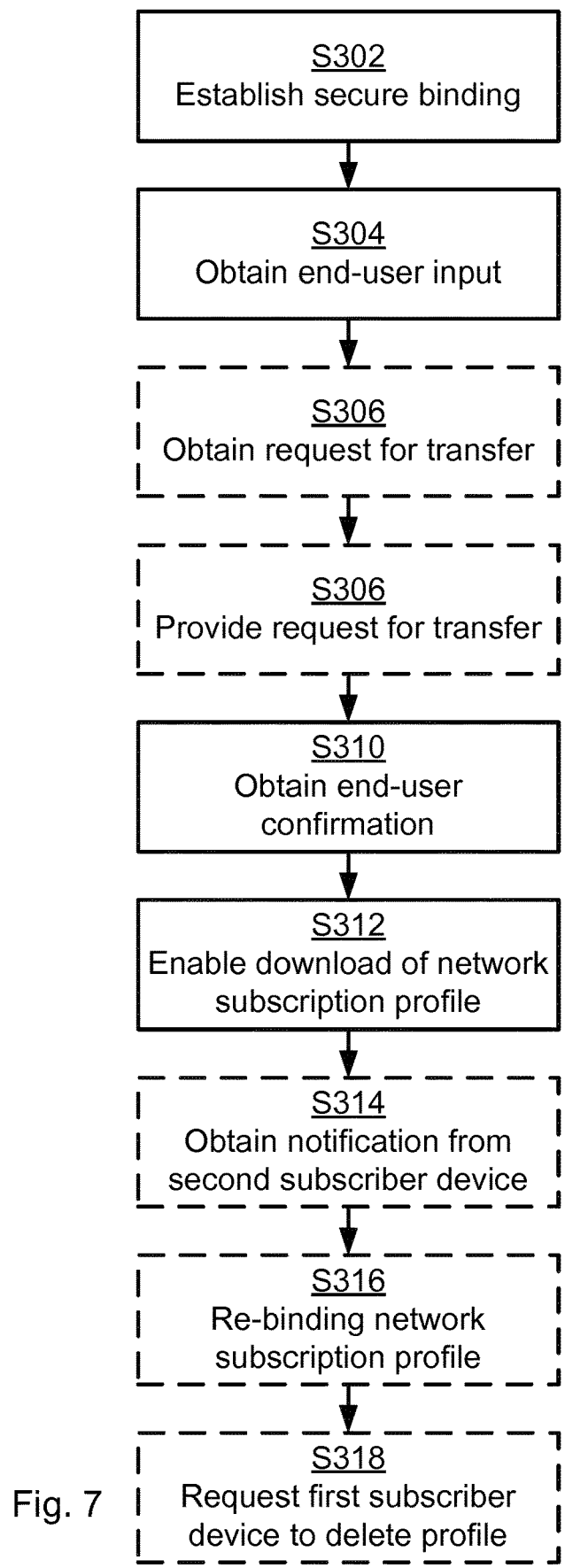

FIGS. 2 and 3 are flowcharts illustrating embodiments of methods for transfer of a network subscription profile 130 from a first subscriber device 200a to a second subscriber device 200b as performed by the subscriber device acting as a first subscriber device 200a. FIGS. 4 and 5 are flowcharts illustrating embodiments of methods for transfer of a network subscription profile 130 from a first subscriber device 200a to a second subscriber device 200b as performed by the subscriber device acting as a second subscriber device 200b. FIGS. 6 and 7 are flowcharts illustrating embodiments of methods for transfer of a network subscription profile 130 as performed by the subscription manager node 300. The methods are advantageously provided as computer programs.

Reference is now made to FIG. 2 illustrating a method for transfer of a network subscription profile 130 from a first subscriber device 200a to a second subscriber device 200b as performed by the subscriber device acting as a first subscriber device 200a according to an embodiment.

S102: The first subscriber device 200a establishes a secure binding with the second subscriber device 200b.

S104: The first subscriber device 200a obtains a request for transfer of the network subscription profile 130.

S106: The first subscriber device 200a obtains end-user confirmation of the transfer of the network subscription profile 130 to the second subscriber device 200b.

S112: The first subscriber device 200a deletes the network subscription profile 130 from itself upon transfer of the network subscription profile 130 to the second subscriber device 200b.

Reference is now made to FIG. 3 illustrating methods for transfer of a network subscription profile 130 from a first subscriber device 200a to a second subscriber device 200b as performed by the subscriber device acting as a first subscriber device 200a according to further embodiments. It is assumed that steps S102, S104, S106, S112 are performed as described above with reference to FIG. 2 and a thus repeated description thereof is therefore omitted.

There could be different ways for the first subscriber device 200a to obtain the end-user confirmation.

According to some aspects the confirmation of the transfer obtained by the first subscriber device 200a itself. Hence, according to an embodiment the end-user confirmation is obtained directly at the first subscriber device 200a (e.g., via PMA 110a). According to some aspects the confirmation of the transfer is obtained by the second subscriber device 200b on behalf of the first subscriber device 200a. Hence, according to an embodiment the end-user confirmation is obtained via the second subscriber device 200b (e.g., via PMA 110b).

According to some aspects the confirmation of the transfer is obtained by the subscription manager node 300 on behalf of the first subscriber device 200a. Hence, according to an embodiment the end-user confirmation is obtained via the subscription manager node 300.

There could be different ways for the network subscription profile 130 to be transferred to the second subscriber device 200b.

According to some aspects the network subscription profile 130 is transferred from eUICC 120a or PMA 110a of the first subscriber device 200a to eUICC 120b of the second subscriber device 200b. Hence, according to an embodiment the first subscriber device 200a is configured to perform (optional) step S110:

S110: The first subscriber device 200a transfers the network subscription profile 130 towards the second subscriber device 200b.

According to some aspects the eSM sends a "Profile Transfer request" to PMA 110 of first subscriber device 200a. Hence, according to an embodiment the request for transfer of the network subscription profile 130 is obtained from the subscription manager node 300 and first subscriber device 200a is configured to perform (optional) step S108:

S108: The first subscriber device 200a provides a response to the subscription manager node 300. The response indicating accept of the transfer. That is, the response indicates accept of the transfer of the network subscription profile 130 from the subscription manager node 300 to the second subscriber device 200b.

There could be different ways for the first subscriber device 200a to obtain the request for transfer of the network subscription profile 130. According to an embodiment the request for transfer of the network subscription profile 130 is obtained from the second subscriber device 200b. According to another embodiment the request for transfer of the network subscription profile 130 is obtained from subscription manager node 300. According to yet another embodiment the request for transfer of the network subscription profile 130 is obtained from end-user input directly at the first subscriber device 200a (e.g., via PMA 110a).

The first subscriber device 200a could be fully powered on when performing the herein disclosed steps. In such a case the steps (except the actual deletion of the network subscription profile 130 from the eUICC 120a) could be performed by the PMA 110a.

Alternatively, the first subscriber device 200a is in a dormant, stand-by mode, when performing the herein disclosed steps. In such a case the PMA 110a may be powerless and hence the steps could be performed by the eUICC 120a.

Reference is now made to FIG. 4 illustrating a method for transfer of a network subscription profile 130 from a first subscriber device 200a to a second subscriber device 200b as performed by the subscriber device acting as a second subscriber device 200b according to an embodiment:

S202: The second subscriber device 200b establishes a secure binding with the first subscriber device 200a.

S204: The second subscriber device 200b obtains end-user input to initiate transfer of the network subscription profile 130.

S206: The second subscriber device 200b provides a request for transfer of the network subscription profile 130 to the second subscriber device 200b.

S212: The second subscriber device 200b receives the network subscription profile 130.

S214: The second subscriber device 200b installs the network subscription profile 130 on the second subscriber device 200b.

Reference is now made to FIG. 5 illustrating methods for transfer of a network subscription profile 130 from a first subscriber device 200a to a second subscriber device 200b as performed by the subscriber device acting as a second subscriber device 200b according to further embodiments. It is assumed that steps S202, S204, S206, S212, S214 are performed as described above with reference to FIG. 4 and a thus repeated description thereof is therefore omitted.

There could be different ways for the second subscriber device 200b to provide the request for transfer of the network subscription profile 130 in step S206. According to some aspects the request is made to the first subscriber device 200a. Hence, according to an embodiment the request for transfer of the network subscription profile 130 is provided to the first subscriber device 200a. According to some aspects the request is made to the subscription manager node 300. Hence, according to another embodiment the request for transfer of the network subscription profile 130 is provided to the subscription manager node 300.

As disclosed above, the second subscriber device 200b could, on behalf of the first subscriber device 200a obtain confirmation of the transfer of the network subscription profile 130. Hence, according to an embodiment the second subscriber device 200b is configured to perform (optional) steps S208, S210:

S208: The second subscriber device 200b obtains end-user confirmation of the transfer of the network subscription profile 130 to the second subscriber device 200b.

S210: The second subscriber device 200b provides the end-user confirmation to the first subscriber device 200a.

For example, eUICC 120a on the first subscriber device 200a could request the second subscriber device 200b to provide a PIN code (where PIN is short for personal identification number). On the second subscriber device 200b, the end-user could by means of PMA 110a, thus be requested to input the PIN code for eUICC 120a or the network subscription profile 130. The PIN code could then be provided to eUICC 120a on the first subscriber device 200a. The eUICC 120a on the first subscriber device 200a could then confirm a successful PIN code with a "PIN code success" response to the second subscriber device 200b.

As disclosed above, there could be different ways for the second subscriber device 200b to receive the network subscription profile 130 (as in step S212).

According to some aspects the network subscription profile 130 is received from the first subscriber device 200a. Hence, according to an embodiment the network subscription profile 130 is received by being transferred to the second subscriber device 200b from the first subscriber device 200a.

According to some aspects the network subscription profile 130 is received from the subscription manager node 300. Hence, according to an embodiment the network subscription profile 130 is received by being downloaded to the second subscriber device 200b from the subscription manager node 300.

There could be different ways for the second subscriber device 200b to install the network subscription profile 130 in step S214. According to an embodiment the network subscription profile 130 is installed on eUICC 120b of the second subscriber device 200b.

Once having installed the network subscription profile 130 in step S214, PMA 110b of the second subscriber device 200b could send a notification to the subscription manager node 300 for re-binding the network subscription profile 130. Hence, according to an embodiment the second subscriber device 200b is configured to perform step (optional) S216:

S216: The second subscriber device 200b provides a notification to a subscription manager node 300 for re-binding the network subscription profile 130 to the second subscriber device 200b.

The second subscriber device 200b could be fully powered on when performing the herein disclosed steps. In such a case the steps (except the actual installing of the network subscription profile 130) could be performed by the PMA 110b.

Alternatively, the second subscriber device 200b is in a dormant, stand-by mode, when performing the herein disclosed steps. In such a case the PMA 110b may be powerless and hence the steps could be performed by the eUICC 120b.

Reference is now made to FIG. 6 illustrating a method for transfer of a network subscription profile 130 as performed by the subscription manager node 300 according to an embodiment.

S302: The subscription manager node 300 establishes a secure binding between the first subscriber device 200a and the second subscriber device 200b.

S304: The subscription manager node 300 obtains end-user input to initiate transfer of the network subscription profile 130 from the second subscriber device 200b.

S310: The subscription manager node 300 obtains end-user confirmation of the transfer of the network subscription profile 130 to the second subscriber device 200b from the first subscriber device (200a)

S312: The subscription manager node 300 enables download of the network subscription profile 130 from the subscription manager node 300 to the second subscriber device 200b.

Reference is now made to FIG. 7 illustrating methods for transfer of a network subscription profile 130 as performed by the subscription manager node 300 according to further embodiments. It is assumed that steps S302, S304, S310, S312 are performed as described above with reference to FIG. 6 and a thus repeated description thereof is therefore omitted.

As disclosed above, the request for transfer of the network subscription profile 130 to the second subscriber device 200b as provided in step S206 by the second subscriber device 200b could be provided to the subscription manager node 300. Hence, according to an embodiment the subscription manager node 300 is configured to perform (optional) step S306:

S306: The subscription manager node 300 obtains a request for transfer of the network subscription profile 130 to the second subscriber device 200b either from end-user input or from the second subscriber device 200b.

As disclosed above, the request for transfer of the network subscription profile 130 obtained by the first subscriber device 200a in step S104 could be provided by the subscription manager node 300. Hence, according to an embodiment the subscription manager node 300 is configured to perform (optional) step S308:

S308: The subscription manager node 300 provides a request of transfer of the network subscription profile 130 to the first subscriber device 200a. The end-user confirmation is obtained in response thereto.

As disclosed above, the second subscriber device 200b could in an optional step S216 provide a notification to the subscription manager node 300 for re-binding the network subscription profile 130 to the second subscriber device

200b. Hence, according to an embodiment the subscription manager node 300 is configured to perform (optional) steps S314, S316:

S314: The subscription manager node 300 obtains a notification from the second subscriber device 200b for re-binding the network subscription profile 130 to the second subscriber device 200b.

S316: The subscription manager node 300 re-binds the network subscription profile 130 to the second subscriber device 200b in response thereto (i.e., in response to having obtained the notification in step S314).

The first subscriber device 200a could be requested by the subscription manager node 300 to delete the network subscription profile 130 from the first subscriber device 200a. Hence, according to an embodiment the subscription manager node 300 is configured to perform (optional) step S318:

S318: The subscription manager node 300 requests the first subscriber device 200a to delete the network subscription profile 130 from the first subscriber device 200a.

There could be different examples of network subscription profiles 130. For example, the network subscription profiles 130 could comprise an International Mobile Subscriber Identity (IMSI) and credentials (and everything else of a standard SIM card). Hence, according to an embodiment the network subscription profile 130 comprises an IMSI and an authentication key of the network subscription profile 130.

Figure 8:
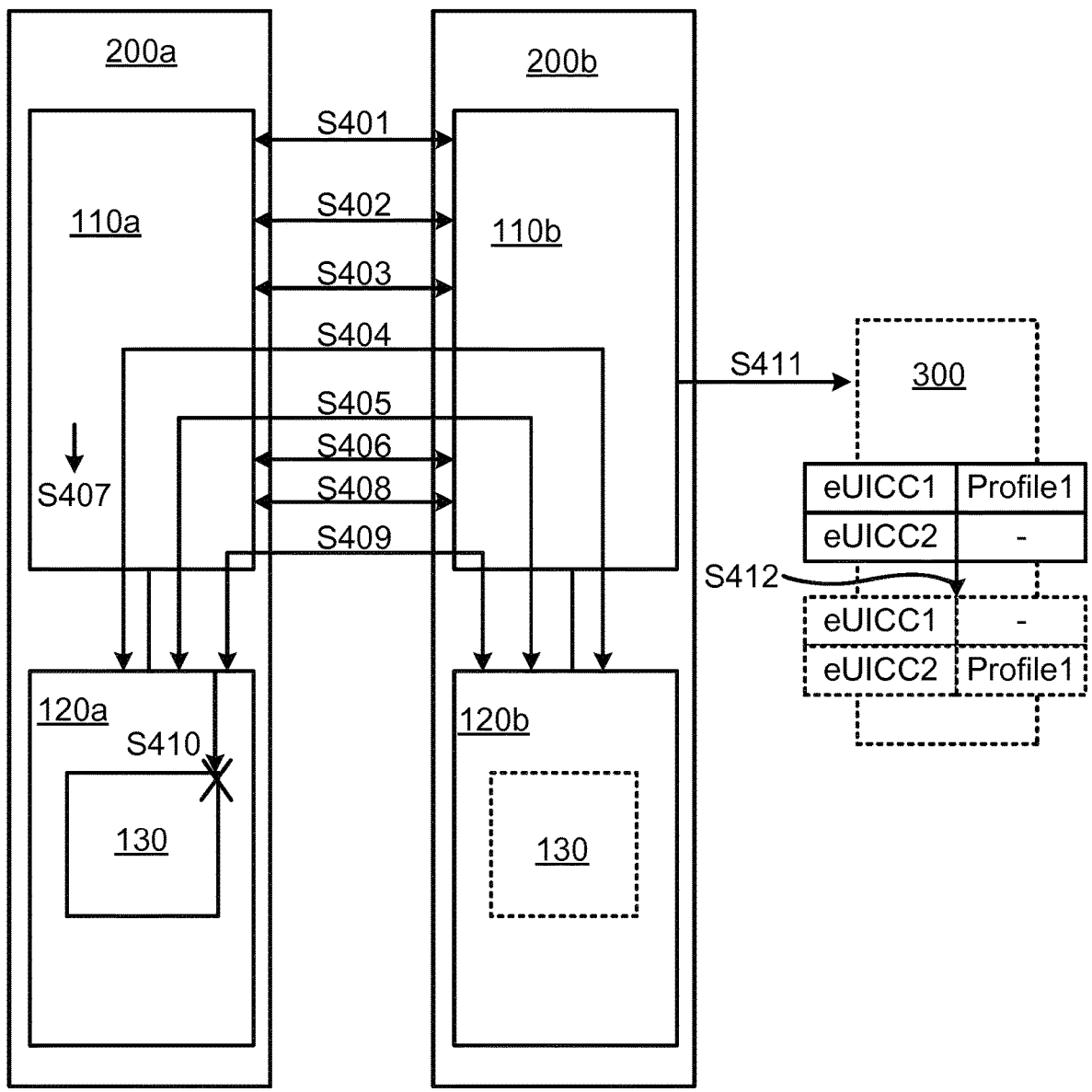
FIGS. 8, 9, and 10 are schematic diagrams illustrating communications systems, including performed operations, according to embodiments

A first particular embodiment for transfer of a network subscription profile 130 based on at least some of the above disclosed embodiments will now be disclosed in detail with reference to FIG. 8.

In this first particular embodiment, both the first subscriber device 200a and the second subscriber device 200b are powered on and are directly operatively connected to each other (using a point-to-point connection). The first subscriber device 200a has initial network connectivity through eUICC 120a. The second subscriber device 200b has no initial network connectivity because there is not any profile provided in eUICC 120b. PMA 110a is running inside the first subscriber device 200a since the first subscriber device 200a is powered on. Further, the subscription manager node 300 is embodied as an eSM and thus the profile management functionality is performed by the eSM 300.

S401: The first subscriber device 200a and the second subscriber device 200b perform secure binding by means of e.g. Bluetooth communications, Universal Serial Bus (USB) communications, WiFi communications, Near-field communication (NFC), or by means of a displaying (by one of the subscriber devices) and reading (by the other of the subscriber devices) a Quick Response Code (QE) code.

S402: PMA 110a and PMA 110b exchange certificates.

S403: PMA 110a and PMA 110b perform mutual authentication.

S404: eUICC 120a and eUICC 120b exchange certificates.

S405: eUICC 120a and eUICC 120b perform mutual authentication.

All requests are signed and protected by corresponding certificates. Detailed security procedures (certificates issuer and chain, signature, exchange certificates, authentication, protection, etc.) are out of scope of this disclosure. Examples of security procedures which could be used are given in Chapter 3.1.2 "Download and Installation" in GSMA Remote Subscription Provisioning Technical Specification Version 1.1, 9 Jun. 2016, and in Chapter 5.1.2 "LPA Initiated Download Procedure" in GSMA Remote Subscription Provisioning Architecture Specification Version 2.0, 23 Aug. 2016.

S406: PMA 110b of the second subscriber device 200b obtains end-user input to initiate a "Profile Transfer request" towards PMA 110a of the first subscriber device 200a.

S407: PMA 110a of the first subscriber device 200a obtains end-user input to confirm "Request to transfer Profile".

S408: PMA 110a responds with a "Profile Transfer Accept" to PMA 110b.

S409: PMA 110a starts to transfer network subscription profile 130 to PMA 110b.

S410: PMA 110a deletes network subscription profile 130 from eUICC 120a after transfer completion.

S411: PMA 110b installs network subscription profile 130 on eUICC 120b. The second subscriber device 200b can successfully attach to a mobile network and obtain cellular network connectivity. PMA 110b then sends a notification to eSM 300 for re-binding network subscription profile 130.

S412: eSM 300 re-binds the profile for network subscription profile 130. In FIG. 8 this is schematically illustrated by the network subscription profile 130 denoted "Profile1" being bound to the eUICC 120b denoted "eUICC2" instead of the eUICC 120a denoted "eUICC1".

Figure 9:
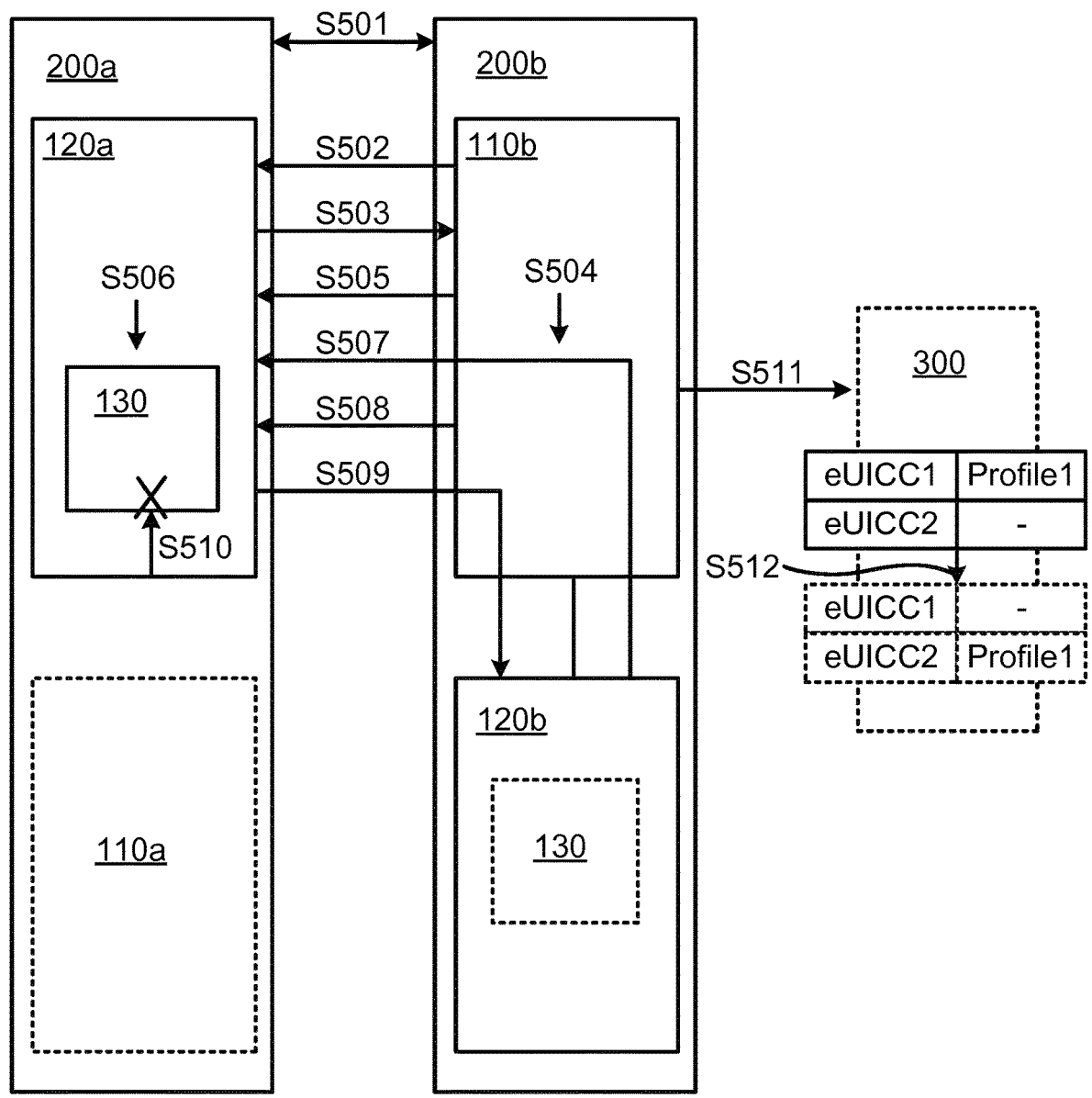

A second particular embodiment for transfer of a network subscription profile 130 based on at least some of the above disclosed embodiments will now be disclosed in detail with reference to FIG. 9.

In this second particular embodiment, the first subscriber device 200a is not powered on but is enabled to communicate using passive mode NFC. The second subscriber device 200b is powered on. The first subscriber device 200a has initial network connectivity through eUICC 120a. The second subscriber device 200b has no initial network connectivity because there is not any profile provided inside eUICC 120b. PMA 110a of the first subscriber device 200a cannot run (and hence is in a dormant mode), because the first subscriber device 200a is powered off. Further, the subscription manager node 300 is embodied as an eSM and thus the profile management functionality is performed by the eSM 300.

S501: eUICC 120a and eUICC 120b exchange certificates beforehand.

S502: PMA 110b of the second subscriber device 200b obtains end-user input to initiate "Initial Binding request", towards eUICC 120a of the first subscriber device 200a. eUICC 120a uses passive mode NFC reading and writing to achieve a two-way communication requiring minimum computation with the second subscriber device 200b.

S503: eUICC 120a responds with "PIN code request" asking for a profile PIN code confirmation. One reason for this is that since the first subscriber device 200a is powered off, the end-user must confirm via the second subscriber device 200b on behalf of the first subscriber device 200a.

S504: PMA 110b obtains the SIM PIN code for network subscription profile 130 from end-user input.

S505: PMA 110b provides the SIM PIN code for network subscription profile 130 to eUICC 120a.

S506: eUICC 120a checks the SIM PIN code for network subscription profile 130 and confirms that it is the correct PIN code for network subscription profile 130. Upon repeated failure of providing the correct SIM PIN code (such as after three continuous failed attempts) the SIM PIN and network subscription profile 130 could be locked. The whole process could then be regarded as failed and be terminated.

S507: eUICC 120*a* and eUICC 120*b* perform mutual authentication. All the following requests are signed and protected by corresponding eUICC certificates.

S508: PMA 110*b* of the second subscriber device 200*b* obtains end-user input to initiate a "Profile Transfer request" towards eUICC 120*a* of the first subscriber device 200*a*.

S509: eUICC 120*a* starts to transfer network subscription profile 130 to PMA 110*b*.

S510: eUICC 120*a* deletes network subscription profile 130 from eUICC 120*a* after transfer completion.

S511: PMA 110*b* installs network subscription profile 130 on eUICC 120*b*. The second subscriber device 200*b* can successfully attach to a mobile network and obtain cellular network connectivity. PMA 110*b* then sends a notification to eSM 300 for re-binding network subscription profile 130.

S512: eSM 300 re-binds the profile for network subscription profile 130. In FIG. 9 this is schematically illustrated by the network subscription profile 130 denoted "Profile1" being bound to the eUICC 120*b* denoted "eUICC2" instead of the eUICC 120*a* denoted "eUICC1".

Figure 10:
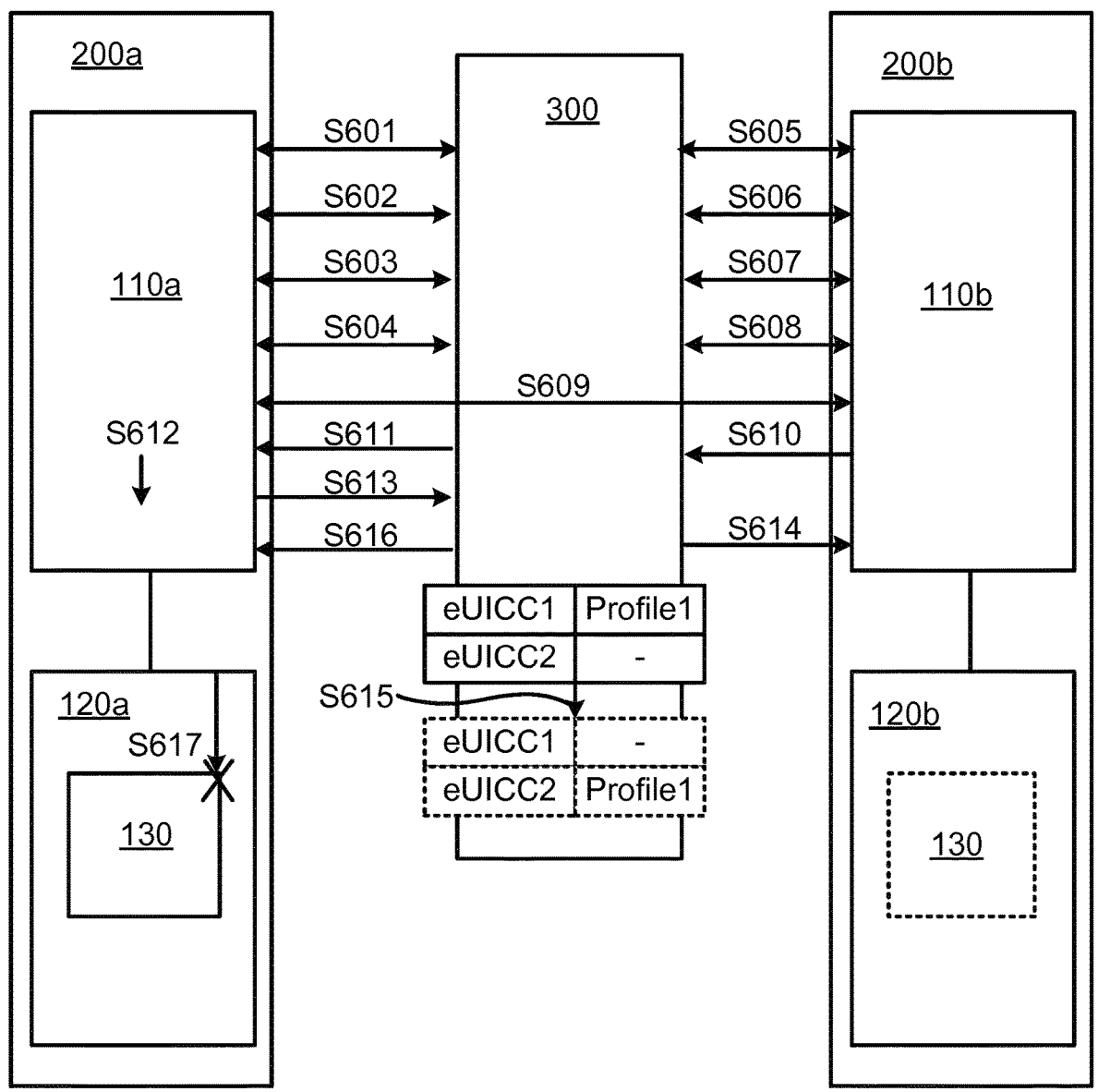

A third particular embodiment for transfer of a network subscription profile 130 based on at least some of the above disclosed embodiments will now be disclosed in detail with reference to FIG. 10.

In this third particular embodiment the subscription manager node 300 is embodied as an eSM and thus the profile management functionality is performed by the eSM 300. Further, in this third particular embodiment, both the first subscriber device 200*a* and the second subscriber device 200*b* are operatively connected to the eSM 300. The first subscriber device 200*a* has initial network connectivity through eUICC 120*a*. The second subscriber device 200*b* has not any initial cellular network connectivity because there is not any profile provided inside eUICC 120*b*, but the second subscriber device 200*b* has some other type of network connectivity that operatively connects the second subscriber device 200*b* to the eSM 300.

S601: PMA 110*a* and eSM 300 exchange certificates.

S602: PMA 110*a* and eSM 300 perform mutual authentication.

S603: eUICC 120*a* and eSM 300 exchange certificates.

S604: eUICC 120*a* and eSM 300 perform mutual authentication.

S605: PMA 110*b* and eSM 300 exchange certificates.

S606: PMA 110*b* and eSM 300 perform mutual authentication.

S607: eUICC 120*b* and eSM 300 exchange certificates.

S608: eUICC 120*b* and eSM 300 perform mutual authentication.

All requests are signed and protected by corresponding certificates. Detailed security procedures (certificates issuer and chain, signature, exchange certificates, authentication, protection, etc.) are out of scope of this disclosure. Examples of security procedures which could be used are given in Chapter 3.1.2 "Download and Installation" in GSMA Remote Subscription Provisioning Technical Specification Version 1.1, 9 Jun. 2016, and in Chapter 5.1.2 "LPA Initiated Download Procedure" in GSMA Remote Subscription Provisioning Architecture Specification Version 2.0, 23 Aug. 2016.

S609: The first subscriber device 200*a* or eUICC 120*a* and the second subscriber device 200*b* or eUICC 120*b* perform secure binding on eSM 300.

S610: PMA 110*b* of the second subscriber device 200*b* obtains end-user input to initiate a "Profile Transfer request" towards PMA 110*a* of the first subscriber device 200*a* via eSM 300.

S611: eSM 300 sends a "Profile Transfer request" to PMA 110*a* of the first subscriber device 200*a*.

S612: PMA 110*a* of the first subscriber device 200*a* obtains end-user input to confirm "Request to transfer Profile".

S613: PMA 110*a* responds with a "Profile Transfer Accept to eUICC 120*b*" to eSM 300.

S614: eSM 300 requests PMA 110*b* to download network subscription profile 130 from eSM 300. PMA 110*b* downloads network subscription profile 130 and installs it on eUICC 120*b*.

S615: eSM 300 re-binds the profile for network subscription profile 130. In FIG. 10 this is schematically illustrated by the network subscription profile 130 denoted "Profile1" being bound to the eUICC 120*b* denoted "eUICC2" instead of the eUICC 120*a* denoted "eUICC1".

S616: eSM 300 requests PMA 110*a* to delete network subscription profile 130 from eUICC 120*a*.

S617: PMA 110*a* deletes network subscription profile 130 from eUICC 120*a*.

Figure 11:
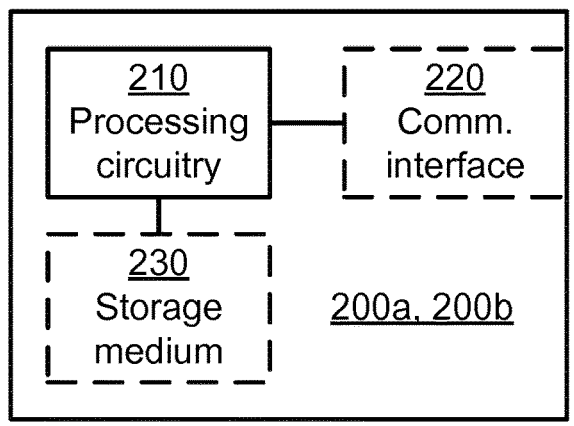
FIG. 11 is a schematic diagram showing functional units of a subscriber device according to an embodiment.

FIG. 11 schematically illustrates, in terms of a number of functional units, the components of a subscriber device 200*a*, 200*b* according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1510*a* (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the subscriber device 200*a*, 200*b* to perform a set of operations, or steps, S102-S112, S202-S216, as disclosed above. For example, the storage medium 230 may store the set of operations, and the processing circuitry 210 may be configured to retrieve the set of operations from the storage medium 230 to cause the subscriber device 200*a*, 200*b* to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The subscriber device 200*a*, 200*b* may further comprise a communications interface 220 for communications with another subscriber device 200*a*, 200*b* and/or a subscription manager node 300. As such the communications interface 220 may comprise one or more transmitters and receivers, comprising analogue and digital components.

The processing circuitry 210 controls the general operation of the subscriber device 200*a*, 200*b* e.g. by sending data and control signals to the communications interface 220 and the storage medium 230, by receiving data and reports from the communications interface 220, and by retrieving data and instructions from the storage medium 230. Other components, as well as the related functionality, of the subscriber device 200*a*, 200*b* are omitted in order not to obscure the concepts presented herein.

Figure 12:
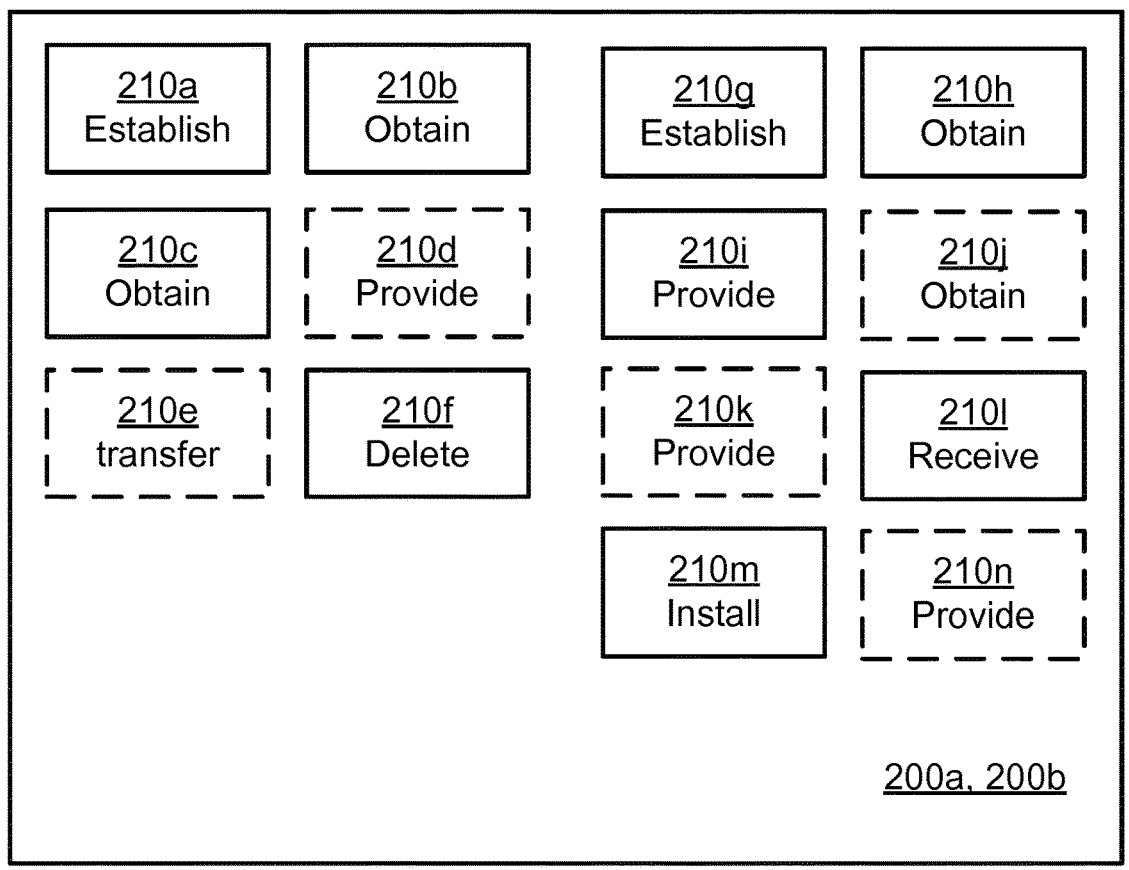
FIG. 12 is a schematic diagram showing functional modules of a subscriber device according to an embodiment.

FIG. 12 schematically illustrates, in terms of a number of functional modules, the components of a subscriber device 200*a*, 200*b* according to an embodiment.

The subscriber device when acting as a first subscriber device 200*a* comprises a number of functional modules; an establish module 210a configured to perform step S102, an obtain module 210b configured to perform step S104, an obtain module 210c configured to perform step S106, and a delete module 210f configured to perform step S112. The subscriber device when acting as a first subscriber device 200a may further comprise a number of optional functional modules, such as any of a provide module 210d configured to perform step S108, and a transfer module 210e configured to perform step S110.

The subscriber device when acting as a second subscriber device 200b comprises a number of functional modules; an establish module 210g configured to perform step S202, an obtain module 210h configured to perform step S204, a provide module 210i configured to perform step S206, a receive module 210l configured to perform step S212, and an install module 210m configured to perform step S214. The subscriber device when acting as a second subscriber device 200b may further comprise a number of optional functional modules, such as any of an obtain module 210j configured to perform step S208, a provide module 210k configured to perform step S210, and a provide module 210n configured to perform step S216.

In general terms, each functional module 210a-210n may be implemented in hardware or in software. Preferably, one or more or all functional modules 210a-210n may be implemented by the processing circuitry 210, possibly in cooperation with functional units 220 and/or 230. The processing circuitry 210 may thus be arranged to from the storage medium 230 fetch instructions as provided by a functional module 210a-210n and to execute these instructions, thereby performing any steps of the subscriber device 200a, 200b as disclosed herein.

Figure 13:
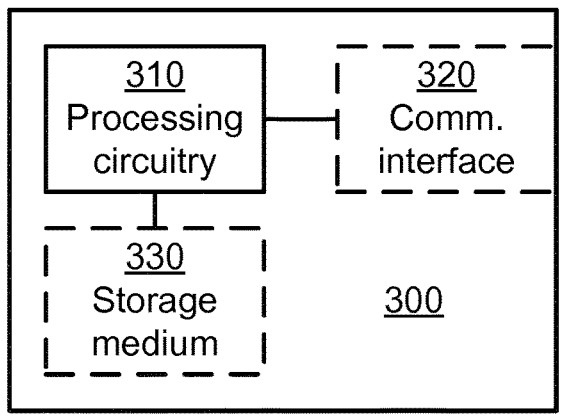
FIG. 13 is a schematic diagram showing functional units of a subscription manager node according to an embodiment.

FIG. 13 schematically illustrates, in terms of a number of functional units, the components of a subscription manager node 300 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1510c (as in FIG. 15), e.g. in the form of a storage medium 430. The processing circuitry 410 may further be provided as at least one application specific integrated circuit (ASIC), or field programmable gate array (FPGA).

Particularly, the processing circuitry 410 is configured to cause the subscription manager node 300 to perform a set of operations, or steps, S302-S318, as disclosed above. For example, the storage medium 430 may store the set of operations, and the processing circuitry 410 may be configured to retrieve the set of operations from the storage medium 430 to cause the subscription manager node 300 to perform the set of operations. The set of operations may be provided as a set of executable instructions. Thus the processing circuitry 410 is thereby arranged to execute methods as herein disclosed.

The storage medium 330 may also comprise persistent storage, which, for example, can be any single one or combination of magnetic memory, optical memory, solid state memory or even remotely mounted memory.

The subscription manager node 300 may further comprise a communications interface 420 for communications with at least one subscriber device 200a, 200b. As such the communications interface 420 may comprise one or more transmitters and receivers, comprising analogue and digital components.

The processing circuitry 410 controls the general operation of the subscription manager node 300 e.g. by sending data and control signals to the communications interface 420 and the storage medium 430, by receiving data and reports from the communications interface 420, and by retrieving data and instructions from the storage medium 430. Other components, as well as the related functionality, of the subscription manager node 300 are omitted in order not to obscure the concepts presented herein.

Figure 14:
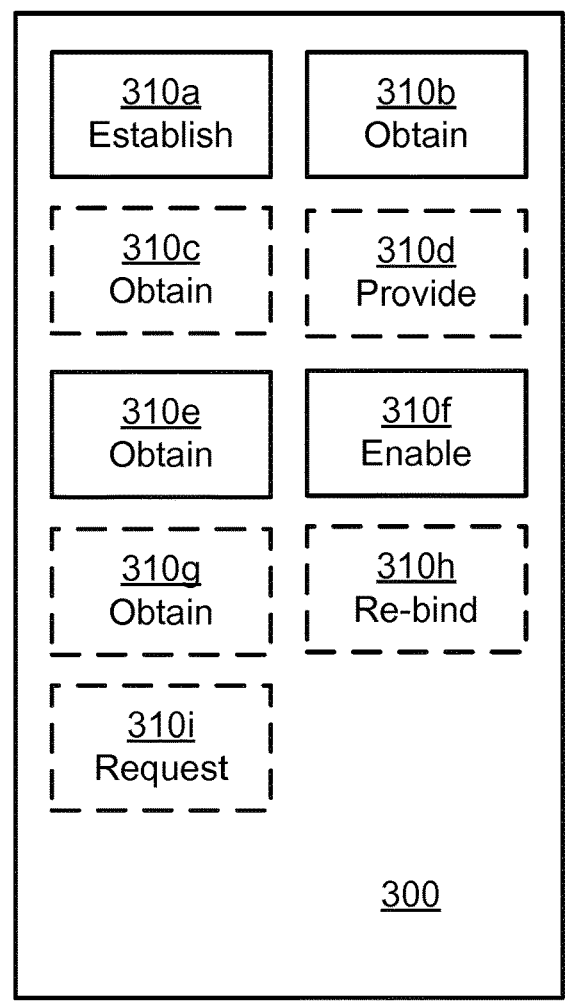
FIG. 14 is a schematic diagram showing functional modules of a subscription manager node according to an embodiment.

FIG. 14 schematically illustrates, in terms of a number of functional modules, the components of a subscription manager node 300 according to an embodiment. The subscription manager node 300 of FIG. 14 comprises a number of functional modules; an establish module 310a configured to perform step S302, an obtain module 310b configured to perform step S304, an obtain module 310e configured to perform step S310, and an enable module 310f configured to perform step S312. The subscription manager node 300 of FIG. 14 may further comprise a number of optional functional modules, such as any of an obtain module 310c configured to perform step S306, a provide module 310d configured to perform step S308, an obtain module 310g configured to perform step S314, a re-bind module 310h configured to perform step S316, and a request module 310i configured to perform step S318. In general terms, each functional module 310a-310i may be implemented in hardware or in software. Preferably, one or more or all functional modules 310a-310i may be implemented by the processing circuitry 410, possibly in cooperation with functional units 420 and/or 430. The processing circuitry 410 may thus be arranged to from the storage medium 430 fetch instructions as provided by a functional module 310a-310i and to execute these instructions, thereby performing any steps of the subscription manager node 300 as disclosed herein.

The subscription manager node 300 may be provided as a standalone device or as a part of at least one further device. For example, a first portion of the instructions performed by the subscription manager node 300 may be executed in a first device, and a second portion of the of the instructions performed by the subscription manager node 300 may be executed in a second device; the herein disclosed embodiments are not limited to any particular number of devices on which the instructions performed by the subscription manager node 300 may be executed. Hence, the methods according to the herein disclosed embodiments are suitable to be performed by a subscription manager node 300 residing in a cloud computational environment. Therefore, although a single processing circuitry 310 is illustrated in FIG. 14 the processing circuitry 310 may be distributed among a plurality of devices, or nodes. The same applies to the functional modules 310a-310i of FIG. 14 and the computer program 1520c of FIG. 15 (see below).

Figure 15:
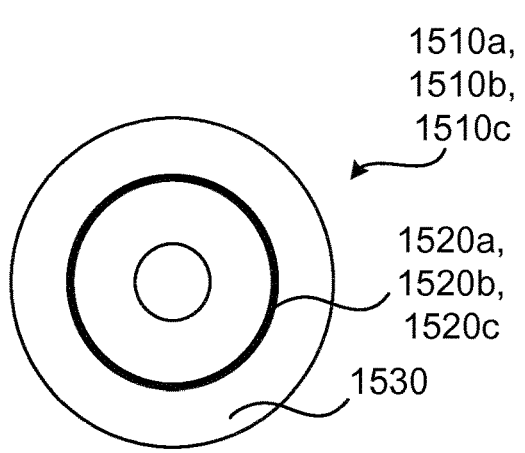
FIG. 15 shows one example of a computer program product comprising computer readable means according to an embodiment.

FIG. 15 shows one example of a computer program product 1510a, 1510b, 1510c comprising computer readable means 1530. On this computer readable means 1530, a computer program 1520a can be stored, which computer program 1520a can cause the processing circuitry 210 and thereto operatively coupled entities and devices, such as the communications interface 220 and the storage medium 230, to execute methods according to embodiments described herein. The computer program 1520a and/or computer program product 1510a may thus provide means for performing any steps of the subscriber device acting as a first subscriber device 200a as herein disclosed. On this computer readable means 1530, a computer program 1520b can be stored, which computer program 1520b can cause the processing circuitry 310 and thereto operatively coupled entities and devices, such as the communications interface 320 and the storage medium 330, to execute methods according to embodiments described herein. The computer program 1520*b* and/or computer program product 1510*b* may thus provide means for performing any steps of the subscriber device acting as a second subscriber device 200*b* as herein disclosed. On this computer readable means 1530, a computer program 1520*c* can be stored, which computer program 1520*c* can cause the processing circuitry 410 and thereto operatively coupled entities and devices, such as the communications interface 420 and the storage medium 430, to execute methods according to embodiments described herein. The computer program 1520*c* and/or computer program product 1510*c* may thus provide means for performing any steps of the subscription manager node 300 as herein disclosed.

In the example of FIG. 15, the computer program product 1510*a*, 1510*b*, 1510*c* is illustrated as an optical disc, such as a CD (compact disc) or a DVD (digital versatile disc) or a Blu-Ray disc. The computer program product 1510*a*, 151*a*, 1510*c* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1520*a*, 1520*b*, 1520*c* is here schematically shown as a track on the depicted optical disk, the computer program 1520*a*, 1520*b*, 1520*c* can be stored in any way which is suitable for the computer program product 1510*a*, 1510*b*, 1510*c*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transferring a network subscription profile from a first subscriber device to a second subscriber device, the method comprising:
    establishing a secure binding with the second subscriber device;
    obtaining a request for transfer of the network subscription profile;
    obtaining end-user confirmation of the transfer of the network subscription profile to the second subscriber device; and
    deleting the network subscription profile from the first subscriber device as a result of a transfer of the network subscription profile to the second subscriber device.

2. The method of claim 1, wherein the end-user confirmation is obtained directly at the first subscriber device.

3. The method of claim 1, wherein the end-user confirmation is obtained via the second subscriber device or via a subscription manager node.

4. The method of claim 1, further comprising:
    the first device storing in a memory the network subscription profile, wherein the stored network subscription profile contains a subscription identifier; and
    the first device transmitting the network subscription profile containing the subscription identifier towards the second subscriber device.

5. The method of claim 1, wherein the request for transfer of the network subscription profile is obtained from a subscription manager node; the method further comprising:
    providing a response to the subscription manager node, the response indicating accept of the transfer.

6. The method of claim 1, wherein the request for transfer of the network subscription profile is obtained from the second subscriber device or via end-user input.

7. The method of claim 1, wherein the first subscriber device comprises an embedded Universal Integrated Circuit Card, eUICC, and wherein the steps are performed by the eUICC.

8. A method being performed by a second subscriber device, the method comprising:
    the second subscriber device establishing a secure binding with a first subscriber device;
    the second subscriber device obtaining end-user input to initiate a transfer of a network subscription profile from the first subscriber device to the second subscriber device, wherein at the time the end-user input is obtained the network subscription profile is stored in the first subscriber device and contains a subscription identifier;
    the second subscriber device receiving the network subscription profile comprising the subscription identifier; and
    installing on the second subscriber device the network subscription profile containing the subscription identifier.

9. The method of claim 8, wherein the request for transfer of the network subscription profile is provided to the first subscriber device or a subscription manager node.

10. The method of claim 8, further comprising:
    obtaining end-user confirmation of the transfer of the network subscription profile to the second subscriber device; and
    providing said end-user confirmation to the first subscriber device.

11. The method of claim 8, wherein the network subscription profile is received by being transferred to the second subscriber device from the first subscriber device.

12. The method of claim 8, wherein the network subscription profile is received by being downloaded to the second subscriber device from a subscription manager node.

13. The method of claim 8, wherein the network subscription profile is installed on an embedded Universal Integrated Circuit Card, eUICC, of the second subscriber device.

14. The method of claim 8, further comprising:
    providing a notification to a subscription manager node for re-binding the network subscription profile to the second subscriber device.

15. The method of claim 8, wherein the second subscriber device comprises an embedded Universal Integrated Circuit Card (eUICC), and wherein the steps are performed by the eUICC.

16. A method for transfer of a network subscription profile, the method being performed by a subscription manager node, the method comprising:
    establishing a secure binding between a first subscriber device and a second subscriber device;
    obtaining, from the second subscriber device, end-user input to initiate a transfer of the network subscription profile from the first subscriber device to the second subscriber device, wherein at the time the end-user input is obtained the network subscription profile is stored in the first subscriber device and contains a subscription identifier;

obtaining, from the first subscriber device, end-user confirmation of the transfer of the network subscription profile to the second subscriber device from the first subscriber device; and enabling the second subscriber device to download from the subscription manager node the network subscription profile containing the subscription identifier.

17. The method of claim 16, further comprising:

obtaining a request for transfer of the network subscription profile to the second subscriber device either from end-user input or from the second subscriber device.

18. The method of claim 16, further comprising:

providing a request of transfer of the network subscription profile to the first subscriber device; and wherein the end-user confirmation is obtained in response thereto.

19. The method of claim 16, further comprising:

obtaining a notification from the second subscriber device for re-binding the network subscription profile to the second subscriber device; and re-binding the network subscription profile to the second subscriber device in response thereto.

20. The method of claim 16, further comprising:

requesting the first subscriber device to delete the network subscription profile from the first subscriber device.

21. A first subscriber device for transfer of a network subscription profile from the first subscriber device to a second subscriber device, the first subscriber device comprising:

a memory storing the network subscription profile;

processing circuitry; and a storage medium storing instructions that, when executed by the processing circuitry, cause the first subscriber device to:

establish a secure binding with said second subscriber device;

obtain a request for transfer of the network subscription profile;

obtain end-user confirmation of the transfer of the network subscription profile to said second subscriber device; and delete the network subscription profile from the memory as a result of a transfer of the network subscription profile to said second subscriber device.

22. The subscriber device of claim 21, wherein the network subscription profile contains a subscription identifier, and the subscriber device is further configured to transfer the network subscription profile containing the subscription identifier towards the second subscriber device.

23. A first subscriber device, the first subscriber device comprising:

processing circuitry; and a storage medium storing instructions that, when executed by the processing circuitry, cause the first subscriber device to:

establish a secure binding with a second subscriber device that comprises a storage medium that stores a network subscription profile that contains a subscription identifier;

obtain end-user input to initiate transfer of the network subscription profile from the second subscriber device to the first subscriber device;

receive the network subscription profile comprising the subscription identifier; and install on the first subscriber device the network subscription profile comprising the subscription identifier.

24. The first subscriber device of claim 23, further being configured to obtain end-user confirmation of the transfer of the network subscription profile; and provide said end-user confirmation to the second subscriber device.

25. A subscription manager node for transfer of a network subscription profile, the subscription manager node comprising:

processing circuitry; and a storage medium storing instructions that, when executed by the processing circuitry, cause the subscription manager node to:

establish a secure binding between a first subscriber device and a second subscriber device, wherein the first subscriber device comprises a storage medium that stores the network subscription profile that contains a subscription identifier;

obtain, from the second subscriber device, end-user input to initiate transfer of the network subscription profile from the first subscriber device to the second subscriber device;

obtain end-user confirmation of the transfer of the network subscription profile to the second subscriber device; and enable the second subscriber device to download from the subscription manager node the network subscription profile containing the subscription identifier.

26. The subscription manager node of claim 25, further being configured to obtain a request for transfer of the network subscription profile to the second subscriber device either from end-user input or from the second subscriber device.

* * * * *